March 11, 1930. C. M. BEGGS 1,749,870
COMBINED MOLE AND RAT TRAP
Filed June 12, 1929

Charley M. Beggs, INVENTOR.
BY Walter N. Haskell,
his ATTORNEY

Patented Mar. 11, 1930

1,749,870

UNITED STATES PATENT OFFICE

CHARLEY M. BEGGS, OF ROCK FALLS, ILLINOIS

COMBINED MOLE AND RAT TRAP

Application filed June 12, 1929. Serial No. 370,195.

My invention has reference to a combined mole and rat trap, of a character which is specially adapted for exterminating the first named animal in its runway beneath the surface of the ground, but which can by a little adjustment be arranged for use above the earth, for catching the last-named animal. The fact that the two animals approach each other in size and habits makes it possible to do this.

The particular construction, arrangement, and manner of operation of the invention will be more fully understood from the following specification, taken in connection with the accompanying drawings, in which:—

Figure 1:
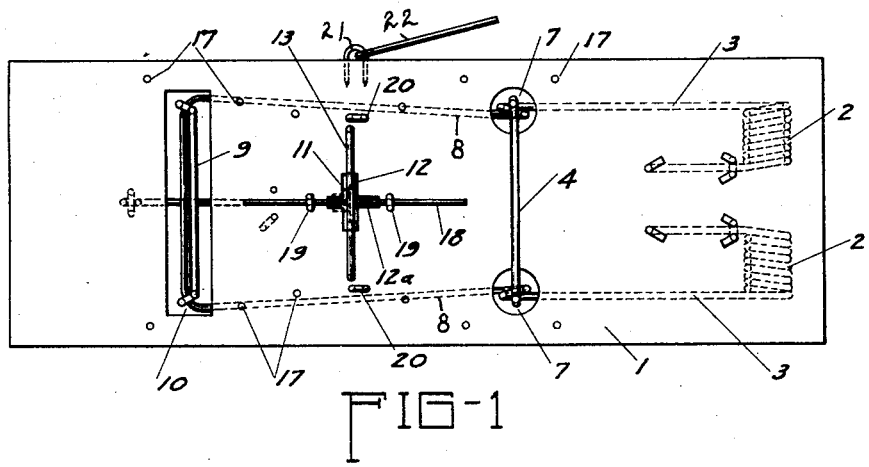
Figure 2:
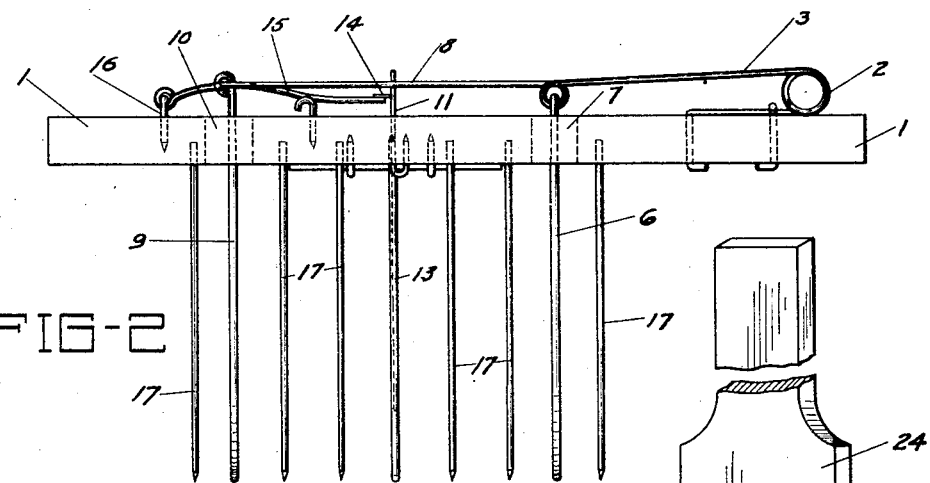
Figure 3:
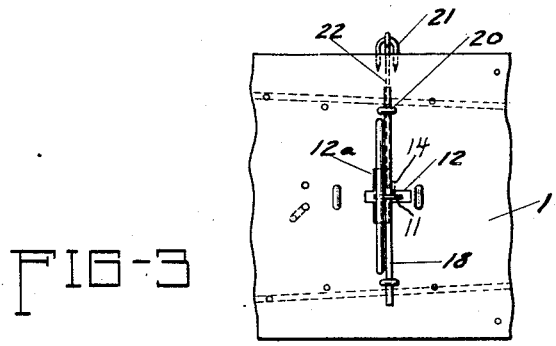
Figure 4:
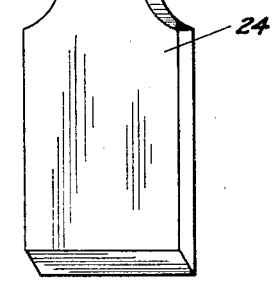

Fig. 1 is a lower plan view of the invention.
Fig. 2 is a side elevation thereof.
Fig. 3 is a fragmentary view, similar to Fig. 1, with some of the parts in adjusted positions.
Fig. 4 is a detail of a blade 24.

The invention is constructed on a base 1, to one end of which is fixed a pair of coiled springs 2, from which is projected a pair of parallel arms 3, with which is connected a wire loop 4, the side wires 6 of which pass through openings 7 in the base 1. The arms 3 are projected further into arms 8, to the end cross-bar of which is secured a loop 9, passing downwardly through an opening 10 in the base. A trigger 11 is suspended in the base, the downwardly projecting end thereof being protected by a wire guard 13. The upper end of the trigger 11 passes through a slot 12 in the base, and is provided with a catch 14, for engagement by the end of a wire latch 15, hinged to a staple 16, fixed in the upper face of the base 1.

Projected from the lower face of the base 1 are pointed wires 17, arranged to prevent the animal from going on the outside of the loops 4 and 9, and guiding the animal into the loop 13, the side wires of which form the central guides for such wire runway. The trigger 11 is supported on a wire 18, removably held in a pair of staples 19, permitting the trigger to swing laterally. When the trap is set with the loops and trigger positioned in the runway of a mole, upon the animal encountering the trigger he forces his way past it, springing the trap, forcing the loops 6 and 9 upwardly, and catching the animal in one or other of such loops.

By removing the rod 18 from the staples 19 the trigger 11 can be turned so as to be located in a cross-slot 12ª of the slot 12, wherein the trigger is swingingly held by the rod 18, inserted in a pair of staples 20, fixed in the base 1 near the sides thereof. In this position the catch 14 is engaged by the end of a wire latch 22, held by a staple 21 fixed to the side of the base 1, such latch projecting above one of the arms 8, and holding the spring loops from upward movement. When thus arranged the trap is set in the runway of rats, which is usually along a wall or between boxes, and in passing through the trap the animal encounters the trigger and pushes it in a direction to dislodge the wire from the catch. This operation is aided by providing some sort of bait at a point near the trigger. The chief use for the trap for catching moles is in the warmer months, and for catching rats in the colder months. so that the trap can be used interchangeably for both of said purposes.

For permitting the ready insertion of the loops 6, 9, and 13 in the ground a blade 24 is provided, which is forced into the earth a sufficient distance to form an opening for the loop. The animal is also forced upwardly into this opening when the trap is sprung.

What I claim, and desire to secure by Letters Patent, is:

1. A combined mole and rat trap, comprising a base, a spring actuated loop supported from said base, means for holding said loop in depressed position, and a trigger, adapted for releasable connection with said means, and convertible from a position for a swinging movement transversely of the trap to a position for swinging longitudinally thereof.

2. A combined mole and rat trap, comprising a base having a transverse and a longitudinal opening, a trigger and means for holding the same selectively in either of said openings, so as to be capable of movement accordingly in a lateral or longitudinal direction, a spring actuated frame on said base, animal snares connected with said frame, guide wires for directing an animal into said snares, means connected with said trigger for holding said snares in set position with the trigger in a transverse position, and means for connection with said trigger for holding said snares in set position with the trigger held in longitudinal position.

In testimony whereof I affix my signature.

CHARLEY M. BEGGS.